(12) United States Patent
Hsieh et al.

(10) Patent No.: US 12,107,665 B2
(45) Date of Patent: Oct. 1, 2024

(54) GENERATING MODEL UPDATE DATA AT SATELLITE

(71) Applicant: Microsoft Technology Licensing, LLC, Redmond, WA (US)

(72) Inventors: Tsu-wang Hsieh, Redmond, WA (US); Jin Hyun So, Los Angeles, CA (US); Behnaz Arzani, Redmond, WA (US); Shadi Abdollahian Noghabi, Bellevue, WA (US); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 17/649,044

(22) Filed: Jan. 26, 2022

(65) Prior Publication Data
US 2023/0239042 A1    Jul. 27, 2023

(51) Int. Cl.
*H04B 7/185* (2006.01)
*H04B 7/15* (2006.01)
*H04B 17/391* (2015.01)

(52) U.S. Cl.
CPC ..... *H04B 7/18539* (2013.01); *H04B 7/18586* (2013.01); *H04B 7/18589* (2013.01); *H04B 17/391* (2015.01)

(58) Field of Classification Search
CPC ...... H04B 7/15; H04B 7/185; H04B 7/18528; H04B 7/18539; H04B 7/18586; H04B 7/18589; H04B 17/391
See application file for complete search history.

(56) References Cited

U.S. PATENT DOCUMENTS

| 11,315,403 B2* | 4/2022 | Kelly | G08B 19/00 |
| 11,657,690 B2* | 5/2023 | Kelly | G01S 19/16 |
| | | | 340/541 |
| 2016/0306824 A1* | 10/2016 | Lopez | G06T 11/60 |
| 2020/0073742 A1* | 3/2020 | Arora | G06N 5/01 |
| 2020/0272899 A1 | 8/2020 | Dunne et al. | |

(Continued)

FOREIGN PATENT DOCUMENTS

WO    2021158313 A1    8/2021

OTHER PUBLICATIONS

Colyer, Adrian, "Orbital Edge Computing: Nano Satellite Constellations as a New Class of Computer System", Retrieved from: https://blog.acolyer.org/2020/10/12/orbital-edge-computing/, Oct. 12, 2020, 8 Pages.

(Continued)

*Primary Examiner* — Kathy W Wang-Hurst
(74) *Attorney, Agent, or Firm* — Alleman Hall & Tuttle LLP

(57) ABSTRACT

A satellite is provided, including an onboard computing device. The onboard computing device may include a processor configured to receive training data while the satellite is in orbit. The processor may be further configured to perform training at a machine learning model based at least in part on the training data. The processor may be further configured to generate model update data that specifies a modification made to the machine learning model during the training. The processor may be further configured to transmit the model update data from the satellite to an additional computing device.

18 Claims, 13 Drawing Sheets

(56) References Cited

U.S. PATENT DOCUMENTS

| | | | |
|---|---|---|---|
| 2020/0336202 A1 | 10/2020 | Zargahi et al. | |
| 2021/0314058 A1* | 10/2021 | Lucia | H04B 7/18515 |
| 2022/0060235 A1* | 2/2022 | Namgoong | G06N 3/047 |
| 2022/0116107 A1* | 4/2022 | Akyildiz | H04W 16/26 |
| 2023/0019771 A1* | 1/2023 | Khosrowshahi | G06N 3/04 |

OTHER PUBLICATIONS

Nguyen, et al., "Federated Learning with Buffered Asynchronous Aggregation", In Repository of arXiv:2106.06639v2, Jul. 19, 2021, 26 Pages.

Sun, et al., "Decentralized Federated Averaging", In Repository of arXiv:2104.11375v1, Apr. 23, 2021, 13 Pages.

Lunga, et al., "ReSFlow: A Remote Sensing Imagery Data-Flow for Improved Model Generalization", In IEEE Journal of Selected Topics in Applied Earth Observations and Remote Sensing, vol. 14, Oct. 8, 2021, pp. 10468-10483.

"International Search Report and Written Opinion Issued in PCT Application No. PCT/US22/053300", Mailed Date: Apr. 4, 2023, 14 Pages.

* cited by examiner

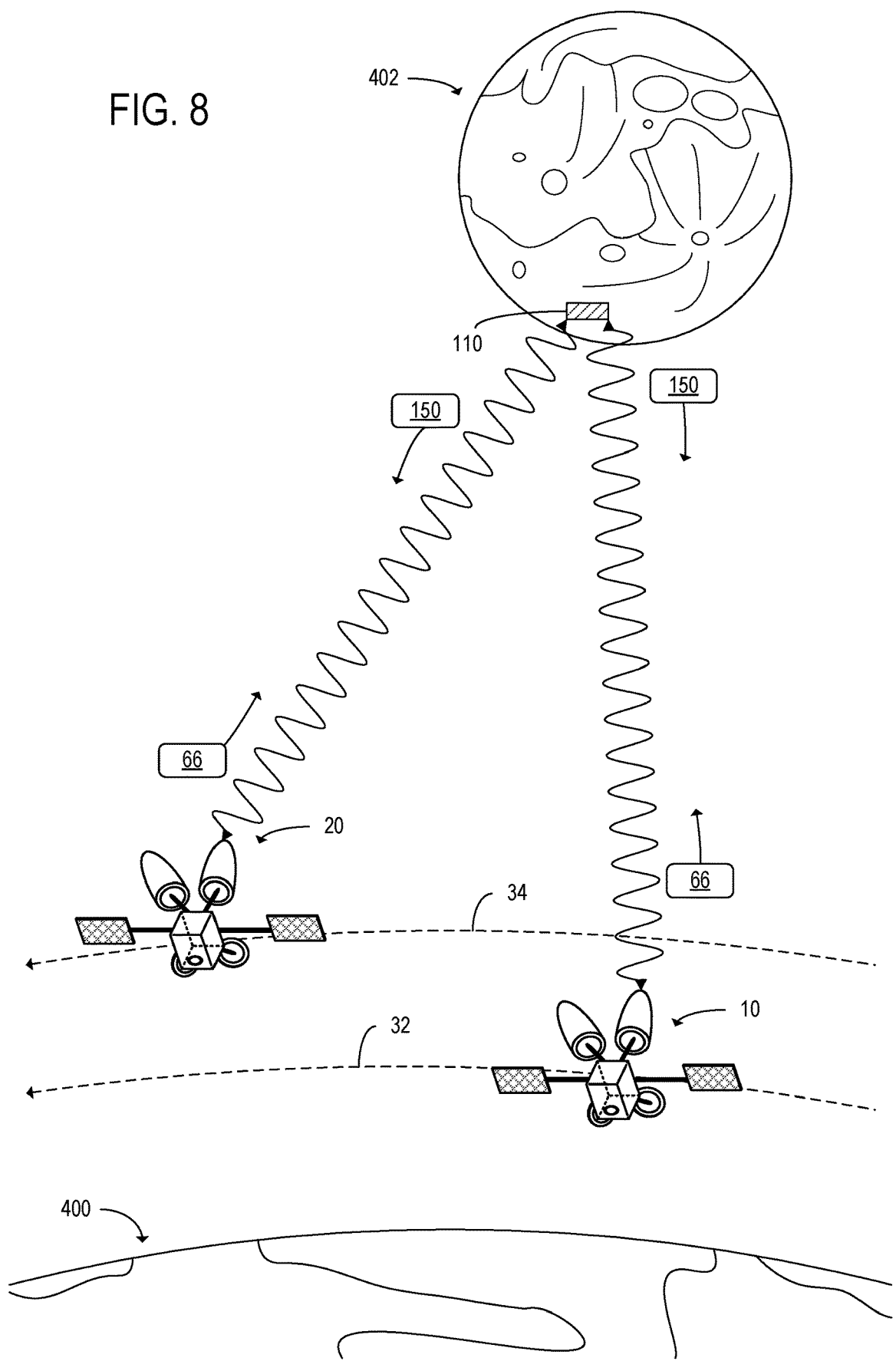

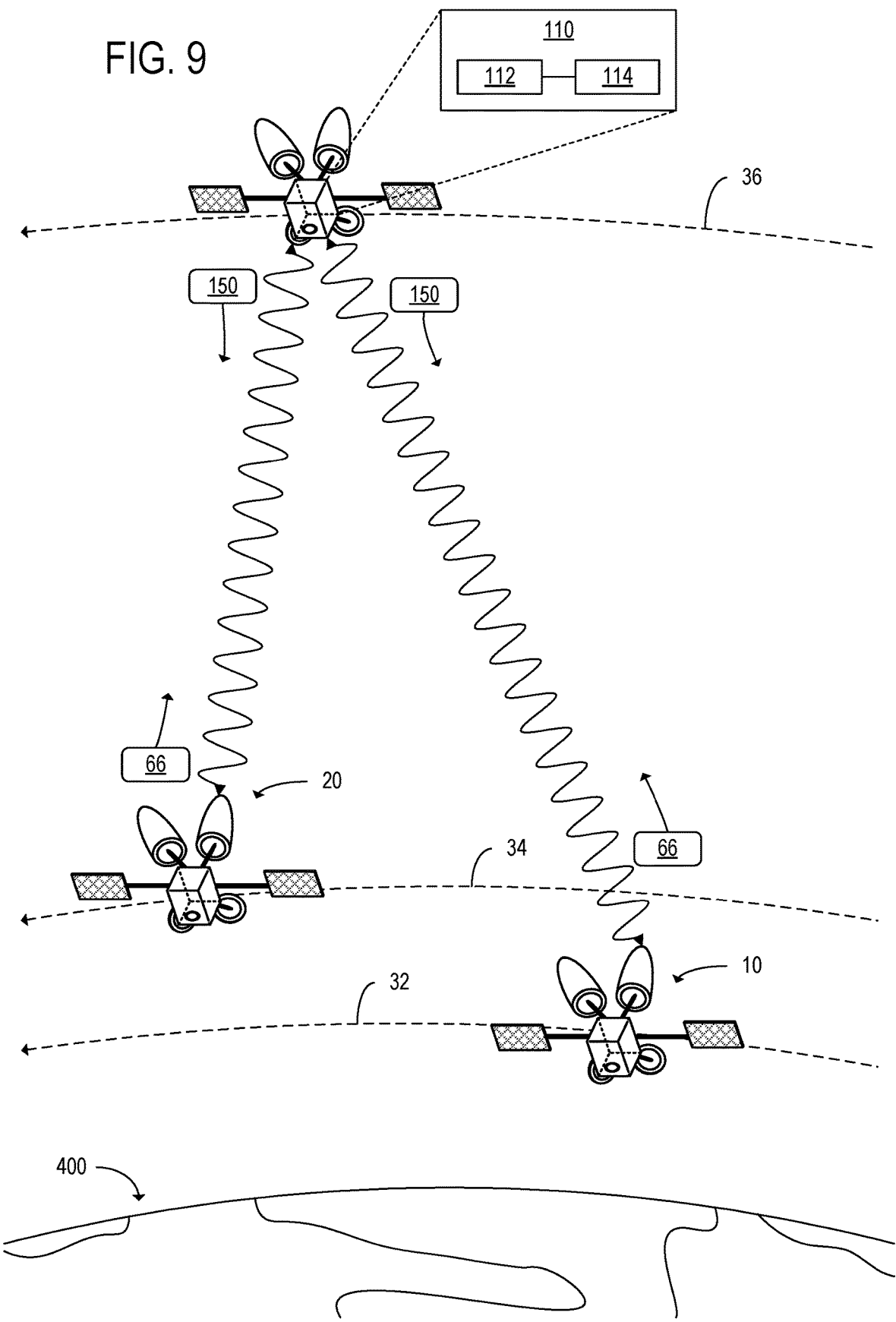

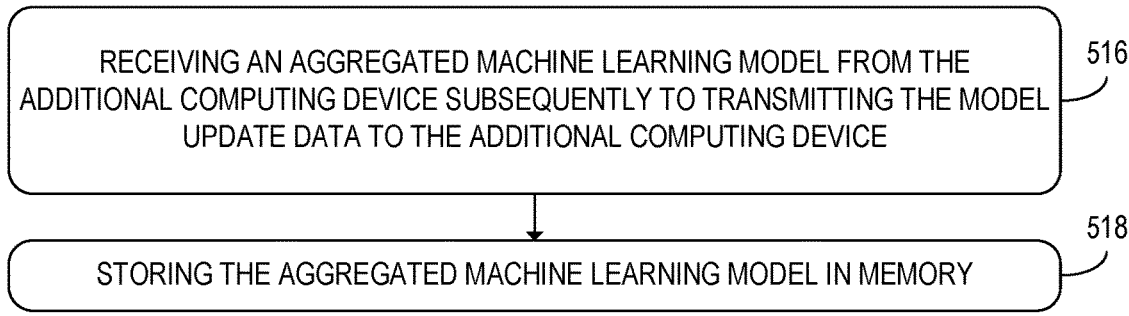
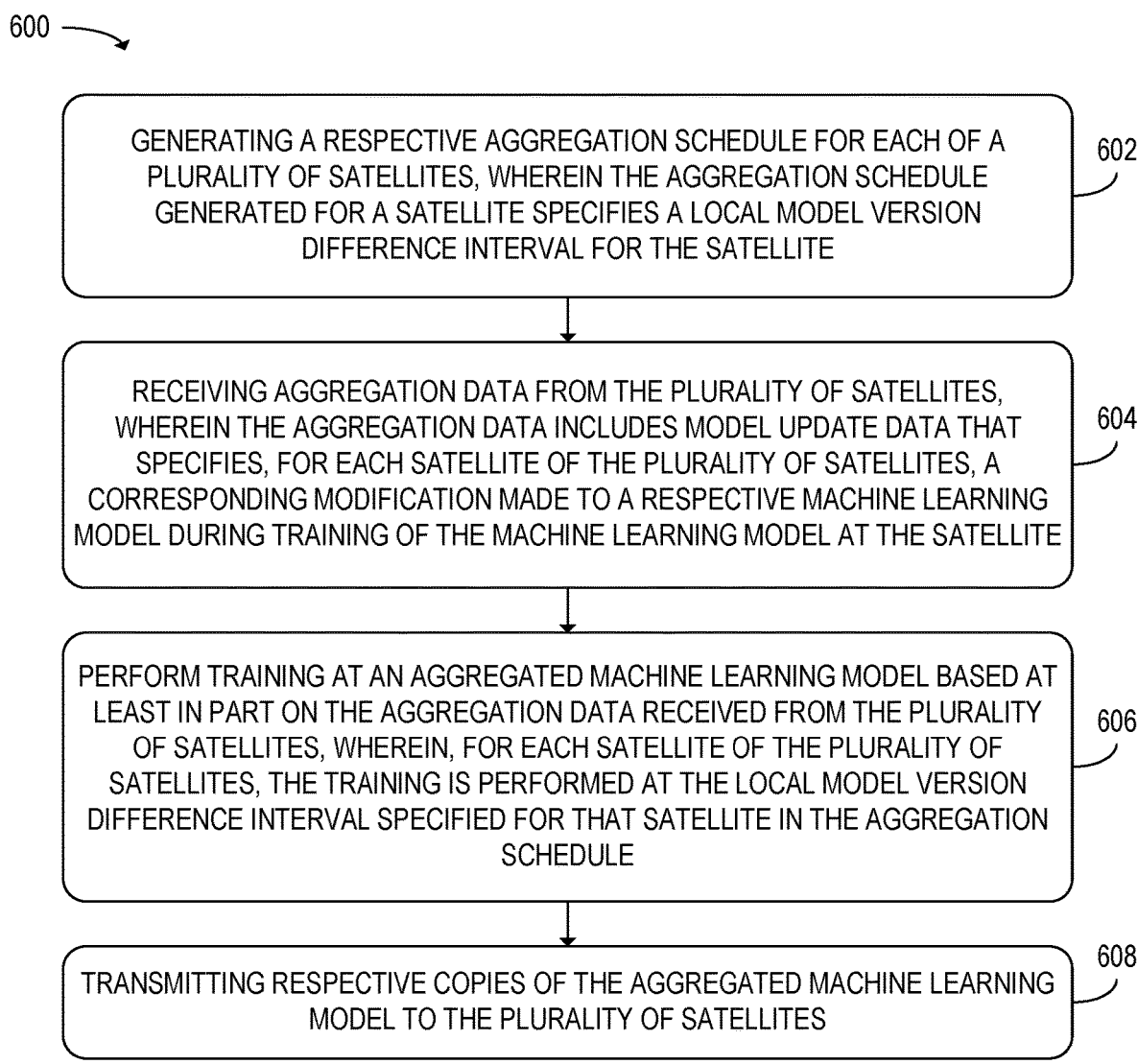

GENERATING MODEL UPDATE DATA AT SATELLITE

BACKGROUND

Decreases in costs associated with deploying satellites into orbit have allowed for the use of large satellite constellations to perform imaging of the Earth. These satellite constellations typically include satellites located in low-Earth orbit (LEO). Satellites located in LEO have orbital periods of approximately 90 minutes and are in communication with ground stations for short time intervals during each orbital period. Thus, communication between the satellites and the ground stations is frequently bandwidth-constrained.

Satellites are also typically energy- and compute-constrained. Satellites are typically powered by photovoltaic cells that provide small quantities of energy to electronic components. In addition, computing hardware included in a satellite typically has low mass and volume in order to decrease the overall size of the satellite and the cost of launching the satellite into orbit. Thus, highly compute-intensive processes are typically not practical to perform via onboard computing at a satellite.

SUMMARY

According to one aspect of the present disclosure, a satellite is provided, including an onboard computing device. The onboard computing device may include a processor configured to receive training data while the satellite is in orbit. The processor may be further configured to perform training at a machine learning model based at least in part on the training data. The processor may be further configured to generate model update data that specifies a modification made to the machine learning model during the training. The processor may be further configured to transmit the model update data from the satellite to an additional computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 shows an example computing environment in which a satellite and the one or more additional satellites orbit the Earth and are configured to wirelessly communicate with an additional computing device located on the moon, according to another example embodiment.

FIG. 9 shows an example computing environment in which centralized federated learning is performed when additional computing device is located in an additional satellite, according to another example embodiment.

FIG. 10C shows additional steps of the method of FIG. 10A that may be performed in some examples subsequently to transmitting the model update data to the additional computing device.

FIG. 11A shows a flowchart of a method for use with a computing device that is configured to communicate with a plurality of satellites, according to the example of FIG. 1.

DETAILED DESCRIPTION

In some satellite imaging applications, training and executing a machine learning model onboard a satellite may be desirable. For example, image classification may be useful to perform at a satellite when satellite image data is used to identify areas affected by disasters such as wildfires and earthquakes. However, the bandwidth, energy, and compute constraints discussed above may present challenges to training a machine learning model at a satellite. For example, due to the wireless connection between the satellite and a ground station having a low bandwidth, the satellite may collect image data more quickly than the satellite is capable of transmitting the image data to the ground station for processing. In addition, due to limitations of the onboard computing hardware of the satellite, training and inferencing may be slow to perform at the machine learning model.

Systems and methods for performing federated learning using satellites are discussed below. In federated learning, model update data that indicates training performed at a local copy of a machine learning model is transmitted from a first computing device to a second computing device. At the second computing device, model update data received from a plurality of computing devices is combined to train an aggregated model. Federated learning allows the training of machine learning models to be parallelized between devices without having to share raw training data. Thus, federated learning may allow for efficient use of communication bandwidth and may allow devices to protect the privacy of the training data.

As discussed in further detail below, the short time intervals of connectivity between satellites and ground stations may present challenges when using existing methods of federated learning. When such existing methods are used, the machine learning models may take large amounts of time to reach high levels of accuracy due to idleness at the satellites or staleness of the model update data. In order to address these challenges, the inventors have provided the following devices and methods.

Figure 1:
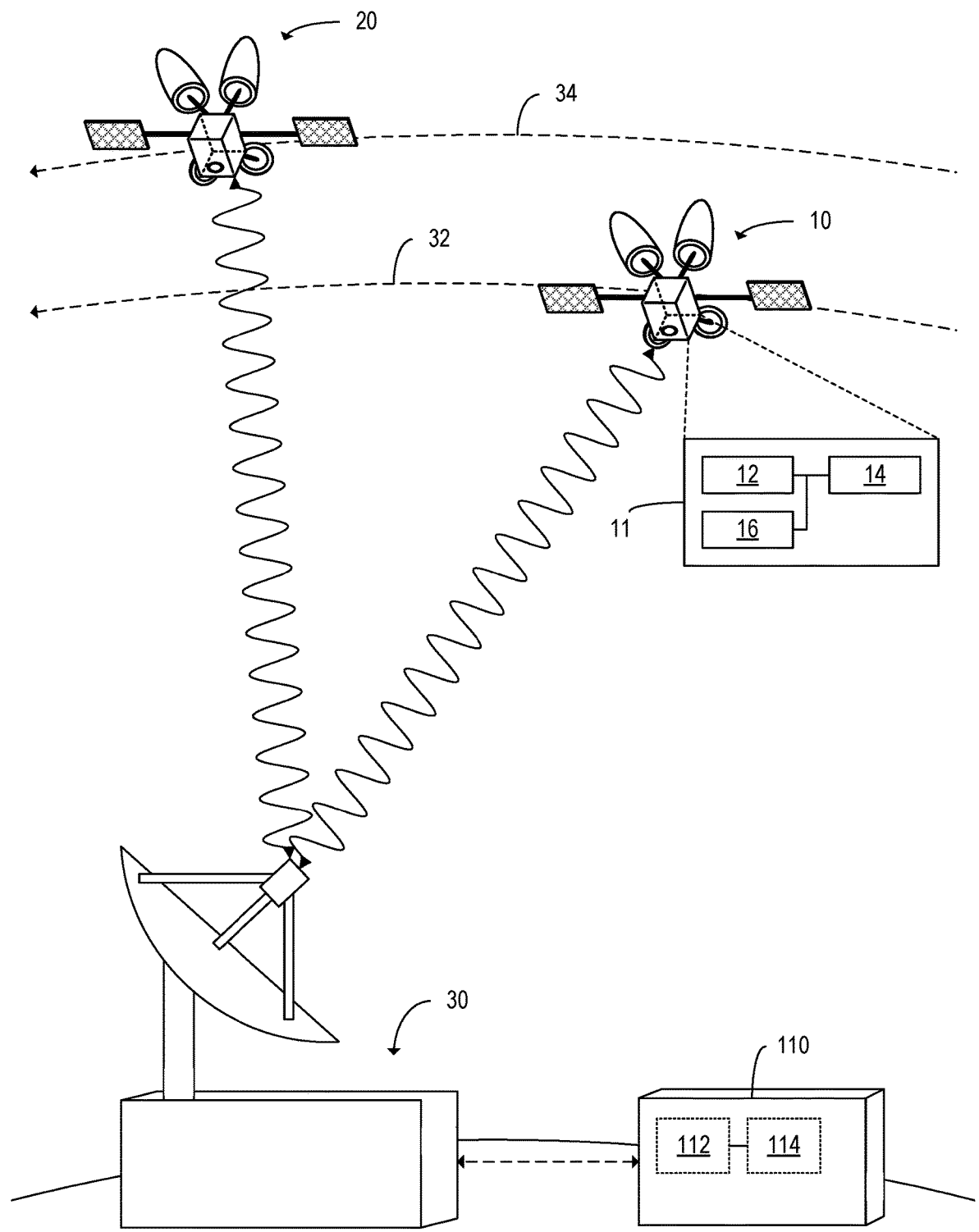
FIG. 1 depicts a satellite, an additional satellite, a ground station, and an additional computing device, according to one example embodiment.

FIG. 1 depicts a satellite 10, according to one example embodiment. The satellite 10 may orbit the Earth in LEO and may be included in a satellite constellation along with one or more additional satellites 20. As depicted in the example of FIG. 1, the satellite 10 may follow a first orbit 32 and the additional satellite 20 may follow a second orbit 34. The satellite 10 may include an onboard computing device 11 including a processor 12 and memory 14. In the example of FIG. 1, the satellite 10 further includes an imaging sensor 16 configured to collect satellite image data of the Earth. The satellite 10 may, in other examples, additionally or alternatively include other types of sensors, such as a non-Earth-facing imaging sensor configured to collect satellite image data of one or more other astronomical bodies.

In some examples discussed in further detail below, rather than being configured to collect satellite image data, the satellite 10 may be a communications satellite configured to receive a communication signal from a ground-based sender device and transmit that communication signal to a ground-based recipient device.

The satellite 10 may be configured to communicate with an additional computing device 110 via a ground station 30. The ground station 30 may be configured to transmit and receive wireless electromagnetic signals to and from the satellite 10 to thereby perform uplink and downlink communication with the satellite 10, respectively. The ground station 30 may be further configured to communicate via a wired or wireless connection with the additional computing device 110. In some examples, the satellite 10 may be configured to communicate with a plurality of ground stations 30. The plurality of ground stations 30 may be configured to communicate with the additional computing device 110.

The additional computing device 110 may include an additional device processor 112 and additional device memory 114. In some examples, the additional computing device 110 may further include one or more user input devices and/or one or more output devices. In some examples, components of the additional computing device 110 may be provided in a single physical computing device, whereas the components of the additional computing device 110 may be distributed among a plurality of physical computing devices in other examples. The additional computing device 110 may be located on-premises at the ground station 30 or may alternatively be a server computing device provided at some other location. For example, an on-premises computing device located at the ground station 30 may be configured to offload data received from the satellite 10 to a data center for processing.

Figure 2:
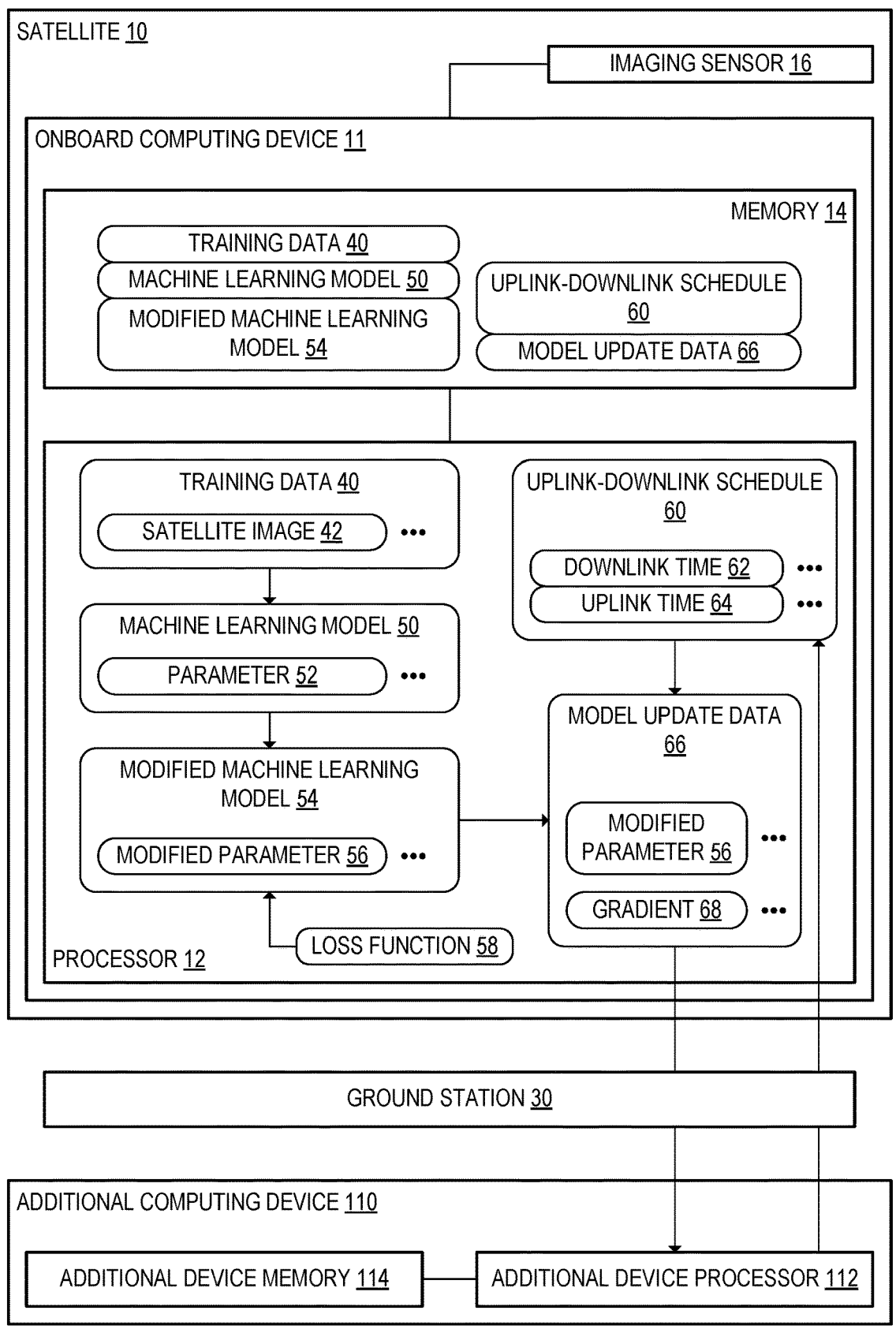
FIG. 2 schematically depicts the satellite and the additional computing device in further detail, according to the example of FIG. 1.

FIG. 2 schematically depicts the satellite 10 and the additional computing device 110 in further detail, according to the example of FIG. 1. As shown in the example of FIG. 2, the processor 12 included in the onboard computing device 11 of the satellite 10 may be configured to receive training data 40 while the satellite 10 is in orbit. In the example of FIG. 2, the training data 40 includes a plurality of satellite images 42 collected at the satellite 10 via the imaging sensor 16. In other examples, the training data 40 may further include data received from one or more other types of sensors. The training data 40 may further include data received via uplink communication from the ground station 30. For example, when the satellite 10 is a communications satellite configured to receive a communication signal from a ground-based sender device, data included in the communication signal may be additionally or alternatively included in the training data 40.

The processor 12 may be further configured to perform training at a machine learning model 50 based at least in part on the training data 40. When the machine learning model 50 is trained, the processor 12 may be configured to generate a modified machine learning model 54 in which a plurality of parameters 52 of the machine learning model 50 have been updated to obtain a plurality of modified parameters 56. For example, the processor 12 may be configured to perform gradient descent using a loss function 58 when updating the machine learning model 50. In some examples in which the training data 40 includes a plurality of satellite images 42, the machine learning model 50 may be a predictive model configured to predict features included in subsequent satellite images 42 and may be trained at the processor 12 via unsupervised or semi-supervised learning. For example, when unsupervised learning is used, the processor 12 may be configured to train the machine learning model 50 to implement a clustering algorithm for the satellite images 42. Other unsupervised learning approaches may alternatively be used, such as principal component analysis, outlier or anomaly detection, etc. In one example of semi-supervised learning, when the processor 12 trains the machine learning model 50, the processor 12 may be configured to utilize a labeled portion of the training data 40. The labeled portion of the training data 40 may include a subset of the plurality of satellite images 42 for which a corresponding plurality of labels have been received from the additional computing device 110. When the processor 12 utilizes the labeled portion of the training data 40, the processor 12 may be configured to train the machine learning model 50 to infer respective labels for other satellite images 42. Other machine learning model training techniques may be performed at the processor 12 in addition to or alternatively to those discussed above.

Figure 3:
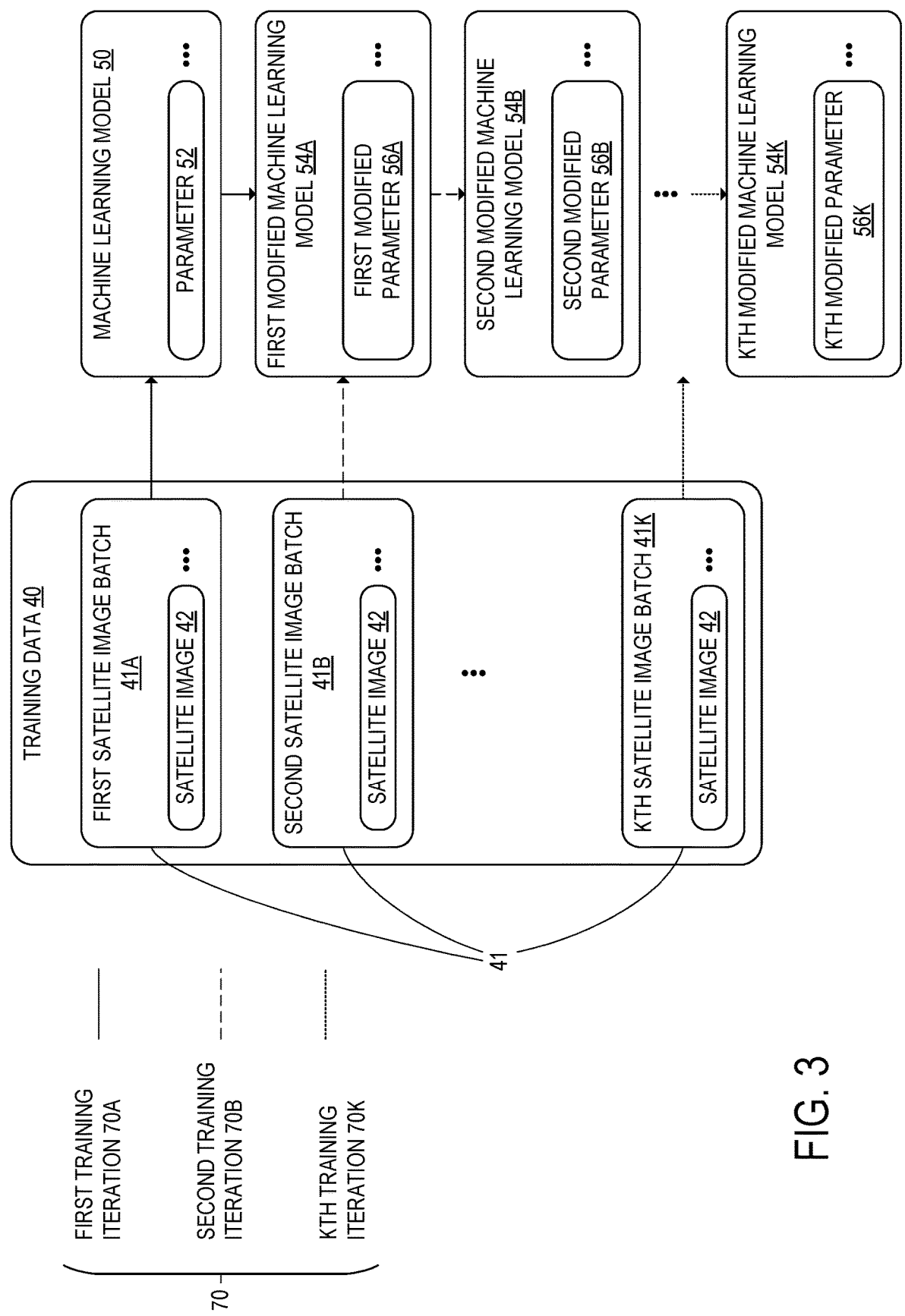
FIG. 3 shows a plurality of training iterations performed at a processor included in the satellite during training of a machine learning model, according to the example of FIG. 2.

FIG. 3 shows a plurality of training iterations 70 that may be performed at the processor 12 during training of the machine learning model 50, according to the example of FIG. 2. In the example of FIG. 3, the training data 40 includes N satellite images 42. The satellite images 42 are organized into K batches 41 that each include one or more of the satellite images 42. In some examples, the satellite 10 may collect more satellite images 42 at the imaging sensor 16 than would be feasible to use as training data for the machine learning model 50 given the compute limitations of the satellite 10, time limitations for the processing, etc. In such examples, each of the batches 41 may include a random or pseudorandom sample of the satellite images 42 collected within some time interval.

The processor 12 is configured to perform K training iterations 70 using the K batches 41 to update the parameters 52 of the machine learning model 50. During a first training iteration 70A, the processor 12 is configured to perform gradient descent calculations with a backpropagation algorithm at the machine learning model 50 using a first batch 41A of one or more satellite images 42 as input. Accordingly, the processor 12 is configured to compute a first modified machine learning model 54A with a plurality of first modified parameters 56A.

The training data 40 in the example of FIG. 3 further includes a second batch 41B of one or more satellite images 42. During a second training iteration, the processor 12 is further configured to perform additional training at the first modified machine learning model 54A based at least in part on the second batch. Thus, the processor 12 is further configured to compute a second modified machine learning model 54B that has a plurality of second modified parameters 56B. In the example of FIG. 3, training is performed for each of the N satellite images 42 included in the training data 40 over the K training iterations 70. Thus, a Kth modified machine learning model 54K including a plurality of Kth modified parameters 56K is computed in a Kth training iteration 70K based at least in part on a Kth batch 41K of one or more satellite images 42.

Returning to FIG. 2, the processor 12 may be further configured to generate model update data 66 that specifies a modification made to the machine learning model 50 during the training when the modified machine learning model 54 is generated. In some examples, the model update data 66 may include the plurality of modified parameters 56 of the modified machine learning model 54 following the modification of the machine learning model 50 at the satellite 10. In other examples, the model update data 66 may include a gradient 68 of a loss function 58 with respect to the plurality of parameters 52. The gradient 68 may, in such examples, be a gradient computed when performing gradient descent with a backpropagation algorithm to train the machine learning model 50.

Subsequently to generating the module update data 66, the processor 12 may be further configured to transmit the model update data 66 from the satellite 10 to the additional computing device 110. The model update data 66 may be transmitted to the additional computing device 110 during a downlink phase in which the satellite 10 has a line of sight to the ground station 30.

The memory 14 of the satellite 10 may store an uplink-downlink schedule 60 for the satellite 10. The uplink-downlink schedule 60 is deterministic, being defined by the available communication windows for line-of-sight communications between the satellite 10, one or more intermediate satellites or other ground stations in the communications path, and the destination ground station 30 on Earth, as calculated from the motions (e.g., revolutions and orbits) of the Earth, satellites, and possibly other celestial bodies. In some example, the processor 12 may be configured to receive the uplink-downlink schedule 60 from the additional computing device 110 and store the uplink-downlink schedule 60 in the memory 14. The uplink-downlink schedule 60 may specify a plurality of downlink times 62 at which the processor 12 is configured to downlink the model update data 66 to the additional computing device 110. In addition, the uplink-downlink schedule 60 may specify one or more uplink times 64 at which the additional computing device 110 is configured to uplink data to the satellite 10. For example, the additional computing device 110 may be configured to uplink an aggregated machine learning model, as discussed in further detail below.

In previous approaches to federated learning, local updates made to machine learning models at edge computing devices are typically aggregated at a central server computing device according to a synchronized schedule. However, in a satellite setting in which the satellite 10 only has intermittent connectivity with the ground station 30, waiting to perform synchronous updates to the aggregated machine learning model may result in long periods of idleness at the satellites. The parameters of the machine learning model may therefore converge slowly during training according to synchronous methods. However, asynchronous transmission of the local updates to the central server computing device may result in divergence during training due to staleness of the updates to the local models. Therefore, the uplink-downlink schedule 60 shown in the example of FIG. 2 is a semi-synchronous aggregation schedule in which model update data 66 is transmitted to the additional computing device 110 in a subset of the plurality of training iterations 70 rather than in each training iteration 70.

Figure 4:
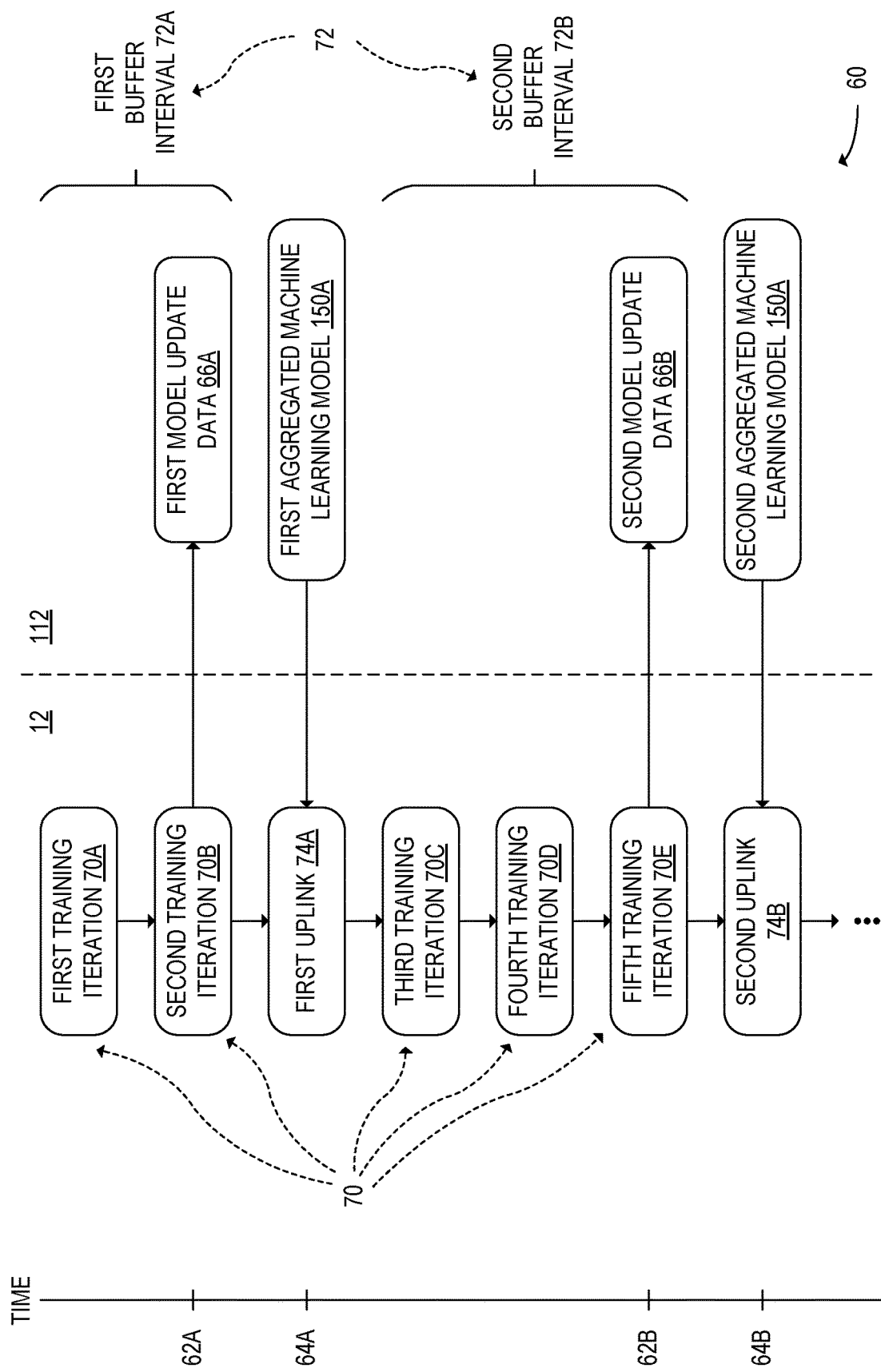
FIG. 4 schematically shows an example aggregation schedule for the satellite, according to the example of FIG. 2.

FIG. 4 schematically shows an example uplink-downlink schedule 60. In the example of FIG. 4, the uplink-downlink schedule 60 includes a plurality of buffer intervals 72 that each include a respective plurality of training iterations 70. In addition, the processor 12 is configured to generate respective model update data 66 for each buffer interval 72 of the plurality of buffer intervals 72. The plurality of buffer intervals 72 may include buffer intervals 72 of different lengths, as shown in the example of FIG. 4. The plurality of buffer intervals 72 depicted in FIG. 4 includes a first buffer interval 72A that includes a first training iteration 70A and a second training iteration 70B. In addition, the plurality of buffer intervals 72 includes a second buffer interval 72B that includes a third training iteration 70C, a fourth training iteration 70D, and a fifth training iteration 70E. In the example uplink-downlink schedule 60, the processor 12 is configured to transmit first model update data 66A to the additional device processor 112 of the additional computing device 110 at a first downlink time 62A that occurs at the end of the first buffer interval 72A. In addition, the processor 12 is configured to transmit second model update data 66B to the additional device processor 112 at a second downlink time 62B that occurs at the end of the second buffer interval 72B.

Figure 5:
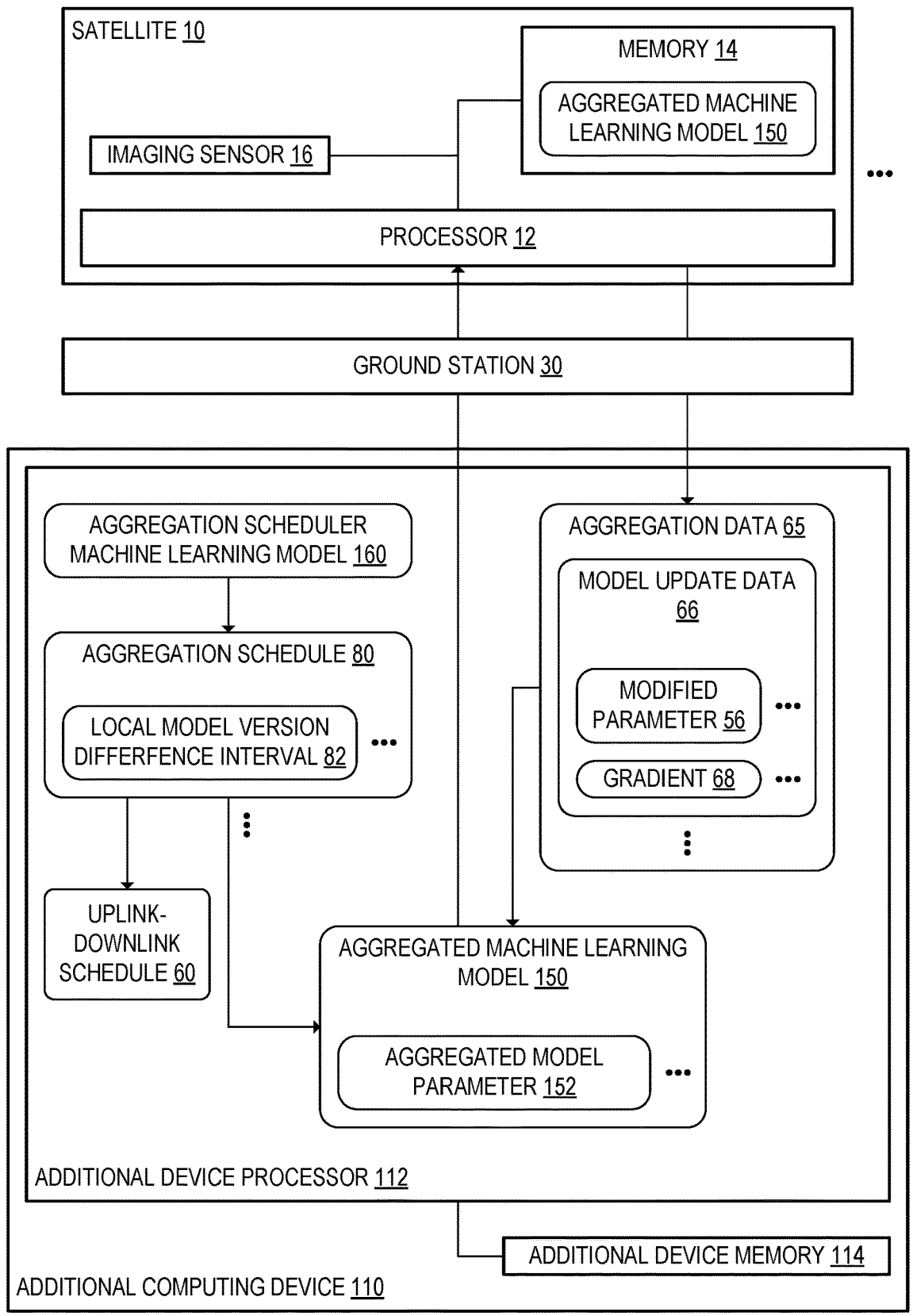
FIG. 5 schematically shows the additional computing device in further detail when an additional device processor of the additional computing device communicates with the satellite, according to the example of FIG. 2.

Turning now to the example of FIG. 5, the additional computing device 110 is shown in further detail when the additional device processor 112 of the additional computing device 110 communicates with the satellite 10. The additional device processor 112 may be configured to generate respective aggregation schedules 80 for each satellite of a plurality of satellites. The plurality of satellites for which the aggregation schedules 80 are generated, as shown in the example of FIG. 5, includes the satellite 10 and the one or more additional satellites 20. As discussed in further detail below, the additional device processor 112 may be configured to generate the aggregation schedules 80 at an aggregation scheduler machine learning model 160. In some examples, rather than generating a plurality of aggregation schedules 80 for the individual satellites, the additional device processor 112 may be configured to generate a unified aggregation schedule for the plurality of satellites.

Each aggregation schedule 80 may be a schedule according to which the additional device processor 112 is configured to update an aggregated machine learning model 150 using aggregation data 65 received from the satellite 10 associated with the aggregation schedule 80. The additional device processor 112 may be configured to receive respective aggregation data 65 from the plurality of satellites at a respective plurality of downlink times 62 indicated in the uplink-downlink schedules 60 for those satellites. The aggregation data 65 may include the model update data 66 for the machine learning model 50. As discussed above, the model update data 66 received from each satellite 10 may specify a corresponding modification made to a respective machine learning model 50 during training of the machine learning model 50 at the satellite 10. The model update data 66 may include a plurality of modified parameters 56 of a modified machine learning model 54 or may include a gradient 68 of a loss function 58 with respect to the parameters 52 of the machine learning model 50.

The respective aggregation schedule 80 generated for each satellite 10 may specify a local model version difference interval 82 for the machine learning model 50 that satellite 10. The local model version difference interval 82 for a machine learning model 50 is the number of sets of model update data 66 received from the satellite 10 between updates to the aggregated machine learning model 150 performed using the model update data 66 received from that satellite 10. Thus, the additional device processor 112 may be configured to wait until a number of sets of model update data 66 equal to the local model version difference interval 82 have been received from the satellite 10 before updating the aggregated machine learning model 150. The aggregated machine learning model 150 may be updated using a buffer of the model update data 66 received during the local model version difference interval 82. In some examples, the aggregation schedule 80 may include a plurality of local model version difference intervals 82 that differ for successive updates to the aggregated machine learning model 150.

As discussed above, subsequently to receiving the aggregation data 65, the additional device processor 112 may be further configured to perform training at an aggregated machine learning model 150 based at least in part on the aggregation data 65 received from the plurality of satellites. The aggregated machine learning model 150 may be trained using a most recent set of model update data 66 received at the end of the local model version difference interval 82. When training is performed at the aggregated machine learning model 150, the additional device processor 112 may be configured to compute a plurality of aggregated model parameters 152 of the aggregated machine learning model 150. For example, the additional device processor 112 may be configured to perform federated averaging, federated stochastic gradient descent, or some other federated learning aggregation method, over the aggregation data 65. Accordingly, the additional device processor 112 may combine the model updates performed at the satellites to compute an aggregated machine learning model 150 based on a larger quantity of training data than is utilized at any of the individual satellites. The aggregated machine learning model 150 may therefore have higher accuracy over a wider range of inputs compared to the modified machine learning models 54 trained at the individual satellites.

In some examples, the additional device processor 112 may be further configured to transmit copies of the aggregated machine learning model 150 to the plurality of satellites. The copies of the aggregated machine learning model may be transmitted at respective uplink times 64 specified in the uplink-downlink schedules 60 for those satellites. Over the course of training, the aggregated machine learning model 150 may be iteratively updated based on newly received aggregation data 65 and transmitted to the satellites. In the example of FIG. 4, the example aggregation schedule includes a first uplink time 64A at which the processor 12 of the satellite 10 is configured to receive a first aggregated machine learning model 150A in a first uplink 74A. In addition, the example uplink-downlink schedule 60 includes a second uplink time 64B at which the processor 12 is configured to receive a second aggregated machine learning model 150B in a second uplink 74B.

Returning to FIG. 5, when the processor 12 of the satellite 10 receives the aggregated machine learning model 150 from the additional computing device 110, the additional device processor 112 may be further configured to store the aggregated machine learning model 150 in the memory 14. In some examples, the modified machine learning model 54 may be overwritten with the aggregated machine learning model 150. Overwriting the modified machine learning model 54 with the aggregated machine learning model 150 may increase the accuracy of machine learning model outputs computed at the satellite 10. In addition, as shown in the example of FIG. 4, further model update data 66 generated at the satellite 10 subsequently to replacing the modified machine learning model 54 with the aggregated machine learning model 150 may be used to iteratively modify the aggregated machine learning model as discussed above.

Figure 6:
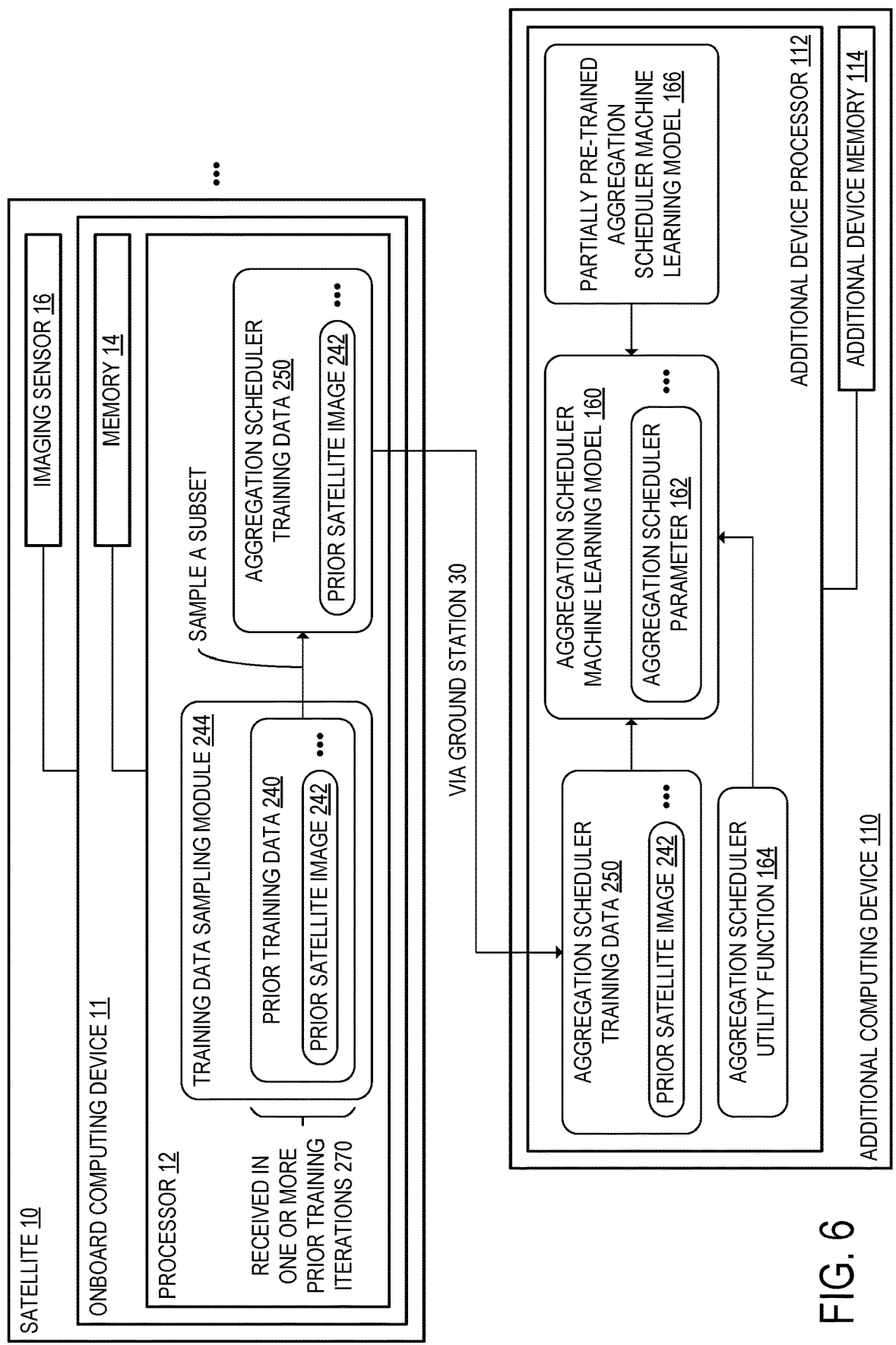
FIG. 6 schematically shows the satellite and the additional computing device during training of an aggregation scheduler machine learning model, according to the example of FIG. 5.

The plurality of aggregation schedules 80 for the satellites may be generated at an aggregation scheduler machine learning model 160, as discussed above. FIG. 6 schematically shows the satellite 10 and the additional computing device 110 during training of the aggregation scheduler machine learning model 160. The aggregation scheduler machine learning model 160 may, for example, be a random forest or a deep neural network, and may have a plurality of aggregation scheduler parameters 162 that are adjusted during training. In addition, an aggregation scheduler utility function 164 may be utilized when training the aggregation scheduler machine learning model 160.

The aggregation scheduler machine learning model 160 may be trained using prior training data 240 received at the processor 12 of the satellite 10 in one or more prior training iterations 270. The one or more prior training iterations 270 may occur before the one or more training iterations 70 for which the model update data 66 is generated as shown in FIG. 3. In the example of FIG. 6, the prior training data 240 includes a plurality of prior satellite images 242 collected by the imaging sensor 16 of the satellite 10.

The processor 12 of the satellite 10 may be further configured to select a subset of the prior training data 240 to be used as aggregation scheduler training data 250. The subset of the prior training data 240 may be selected at a training data sampling module 244 at which the processor 12 is configured to select a random or pseudorandom sample of the prior training data 240. The processor 12 may be further configured to transmit the aggregation scheduler training data 250 to the additional computing device 110. Accordingly, a representative sample of the prior training data 240 may be transmitted from the satellite 10 to the additional computing device 110, thereby allowing the additional device processor 112 to train the aggregation scheduler machine learning model 160 without having to use large amounts of bandwidth to downlink the entirety of the prior training data 240.

The additional device processor 112, as shown in the example of FIG. 6, may be further configured to receive the aggregation scheduler training data 250 from the plurality of satellites. In the example of FIG. 6, the aggregation scheduler training data 250 includes a subset of the prior training data 240 of the respective plurality of machine learning models 50 of the plurality of satellites.

The additional device processor 112 may be further configured to train the aggregation scheduler machine learning model 160 based at least in part on the aggregation scheduler training data 250. The additional device processor 112 may be configured to train the aggregation scheduler machine learning model 160 to approximate a maximum of the aggregation scheduler utility function 164. In examples in which the aggregation scheduler machine learning model 160 is a deep neural network, the additional device processor 112 may be configured to perform gradient ascent to compute the estimated maximum of the aggregation scheduler utility function 164. In examples in which the aggregation scheduler machine learning model 160 is a random forest, the additional device processor 112 may be configured to perform random forest regression to compute the estimated maximum.

In one example, the optimal aggregation schedule that maximizes the aggregation scheduler utility function 164 is given by:

$$a^* = \arg\max_{a_i \in \{0,1\}^r} f(s(a_i), \tau)$$

In the above equation, $\tau$ is a training status of the machine learning model 50 that indicates a current training iteration of the machine learning model 50. $a_i$ is an aggregation schedule 60 after i training iterations 70 that indicates, for each of the i training iterations 70, whether model update data 66 for that training iteration 70 was aggregated into the aggregated machine learning model 150, with 0 indicating no aggregation and 1 indicating aggregation. $s(a_i)$ is a staleness function for the aggregation schedule $a_i$ that indicates the local model version difference interval 82. $f$ is the aggregation scheduler utility function 164, which in this example takes the staleness and the training status as inputs. Thus, the additional device processor 112 may be configured to train the aggregation scheduler machine learning model via gradient ascent or random forest regression to thereby estimate the optimal aggregation schedule a* that maximizes the aggregation scheduler utility function $f$.

In some examples, the additional device processor 112 may be configured to perform transfer learning when training the aggregation scheduler machine learning model 160. In such examples, prior to receiving the aggregation scheduler training data 250, the additional device processor 112 may be configured to obtain a partially pre-trained aggregation scheduler machine learning model 166. The partially pre-trained aggregation scheduler machine learning model 166 may be an aggregation scheduler machine learning model that was trained, at the additional computing device 110 or some other computing device, using a prior set of aggregation scheduler training data 250. Subsequently to obtaining the partially pre-trained aggregation scheduler machine learning model 166, the additional device processor 112 may be further configured to train the aggregation scheduler machine learning model 160 at least in part by performing transfer learning at the partially pre-trained aggregation scheduler machine learning model 166 using the aggregation scheduler training data 250. By initializing the aggregation scheduler parameters 162 with values closer to their final values, performing transfer learning to train the aggregation scheduler machine learning model 160 may reduce the amount of computation performed during training. In addition, performing transfer learning may allow the amount of aggregation scheduler training data 250 to be reduced.

In some examples, the additional device processor 112 may be further configured to iteratively update the aggregation scheduler machine learning model 160 during runtime. In such examples, the additional device processor 112 may be configured to receive additional aggregation scheduler training data 250 from the plurality of satellites subsequently to the initial training of the aggregation scheduler machine learning model 160. The additional aggregation scheduler training data 250 may include samples of the training data 40 received at the processors 12 of the satellites subsequently to receiving the prior training data 240. The additional device processor 112 may be further configured to perform additional training at the aggregation scheduler machine learning model 160 based at least in part on the additional aggregation scheduler training data 250.

Returning to the example of FIG. 5, the additional device processor 112 may be configured to generate the respective uplink-downlink schedules 60 for the satellites based at least in part on the aggregation schedule 80. The additional device processor 112 may be further configured to communicate with the satellites according to the uplink-downlink schedules 60 generated in this manner. For example, the additional device processor 112 may be configured to schedule an uplink of the aggregated machine learning model 150 to the satellite 10 to occur at a time at which the aggregated machine learning model 150 has been modified since the previous uplink, as indicated by the aggregation schedule. Thus, redundant uplinks of the aggregated machine learning model 150 to the satellite 10 may be avoided. In addition, the uplink-downlink schedule 60 for the satellite 10 may include instructions for the processor 12 to downlink the model update data 66 to the additional computing device 110 at a time at which the previous model update data 66 downlinked from the satellite 10 to the additional computing device 110 has been aggregated into the aggregated machine learning model 150. Accordingly, the processor 12 may be configured to utilize the aggregation schedule 80 to avoid unnecessary downlinks of the model update data 66 that would be superseded by later model update data 66 prior to aggregation.

Figure 7:
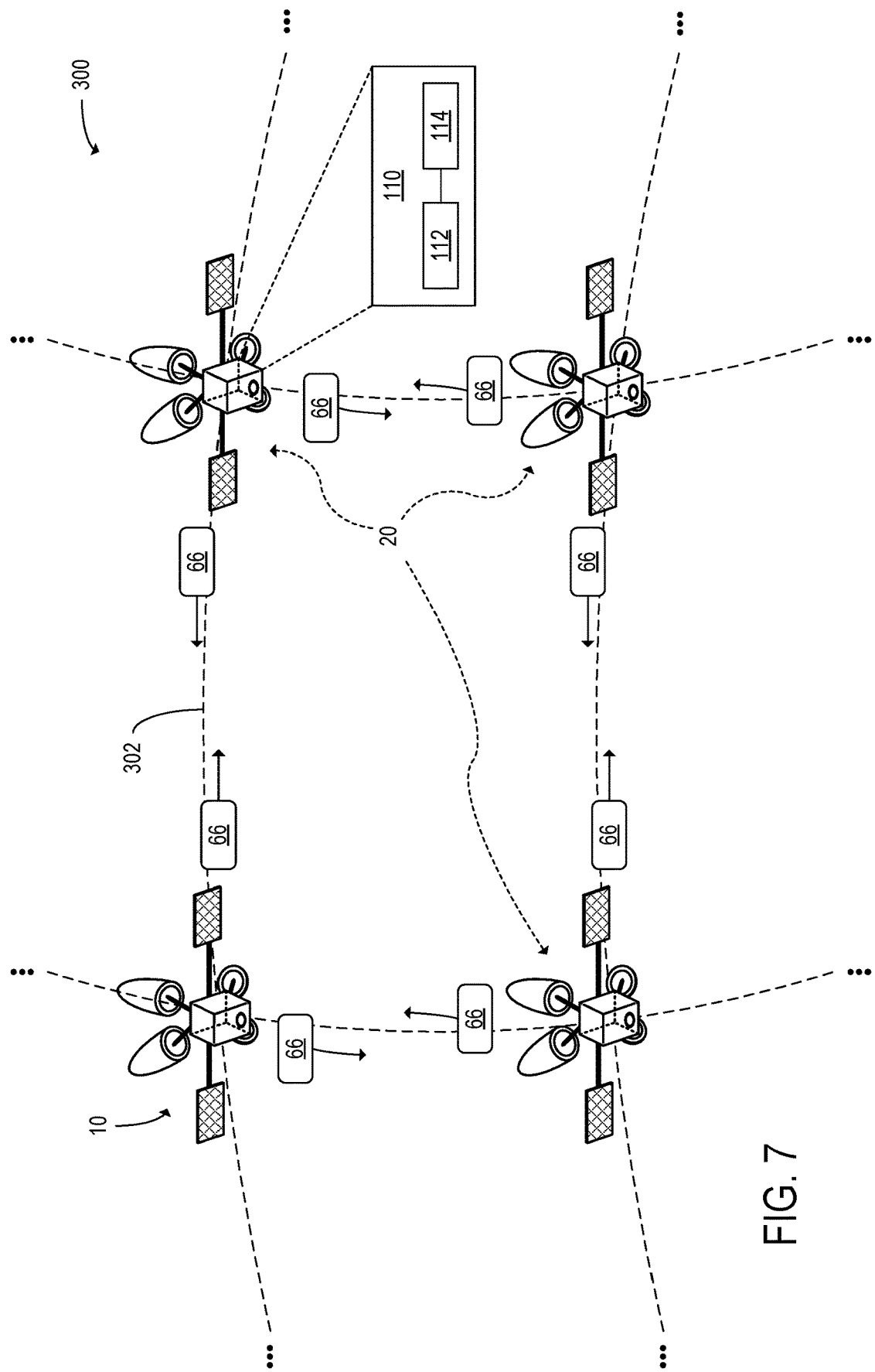
FIG. 7 shows an example satellite network graph including the satellite and a plurality of additional satellites, according to the example of FIG. 1.

The examples of FIGS. 5 and 6 show the satellite 10 and the additional computing device 110 when centralized federated learning is performed. However, decentralized federated learning may alternatively be performed in other examples, as depicted in FIG. 7. FIG. 7 shows an example satellite network graph 300 including at least the satellite 10 and a plurality of additional satellites 20. Communication channels between the satellites included in the satellite network graph 300 are shown in FIG. 7 as network graph edges 302. The additional computing device 110 is an additional onboard computing device of an additional satellite 20 in the example of FIG. 7.

Even though the satellite network graph 300 shown in the example of FIG. 7 does not include a centralized server computing device at which the model update data 66 is configured to be aggregated, the satellites may be configured to transmit respective model update data 66 to each other over the network graph edges 302 and to update the parameters 52 their respective machine learning models 50 based at least in part on the model update data 66 they receive from each other. Machine learning model updates may propagate through the satellite network graph 300 via transmission of the model update data 66, and the processors 12 of the satellite 10 and the additional satellites 20 may be configured to perform aggregation at their respective machine learning models 50. Thus, the respective machine learning models 50 stored at the satellite and the additional satellites 20 may each function as aggregated machine learning models 150 to the other satellites included in the satellite network graph 300.

Although the additional computing device 110 is located on the surface of the Earth in the example of FIG. 1, the satellite 10 and the one or more additional satellites 20 may alternatively be configured to perform centralized federated learning using a space-based additional computing device 110. FIG. 8 shows an example computing environment in which the satellite 10 and the one or more additional satellites 20 orbit the Earth 400 and are configured to wirelessly communicate with an additional computing device 110 located on the moon 402.

In other examples, as shown in FIG. 9, the additional computing device 110 may be located in an additional satellite 20 of the one or more additional satellites 20 when centralized federated learning is performed. The additional satellite 20 in which the additional computing device 110 is located is shown in a third orbit 36. The additional satellite 20 may be located in a higher orbit relative to the satellite 10, as shown in FIG. 9. For example, the additional satellite 20 that includes the additional computing device 110 may be located in geosynchronous or geostationary orbit, whereas the satellite 10 is located in LEO.

In some examples, the satellite 10 and the one or more additional satellites 20 may be in orbit around a celestial body other than the Earth 400. For example, the plurality of satellites may orbit the moon 402. In examples in which the satellite 10 and the one or more additional satellites 20 orbit a celestial body other than the Earth 400, the additional computing device 110 may be located on a surface of that celestial body or may be provided at an additional satellite 20 orbiting that celestial body. Centralized or decentralized federated learning may be performed in examples in which the plurality of satellites orbit a celestial body other than the Earth 400.

In some examples, federated learning may be performed at least in part at one or more other types of space-based computing devices, such as computing devices located on non-satellite spacecraft.

Figure 10A:
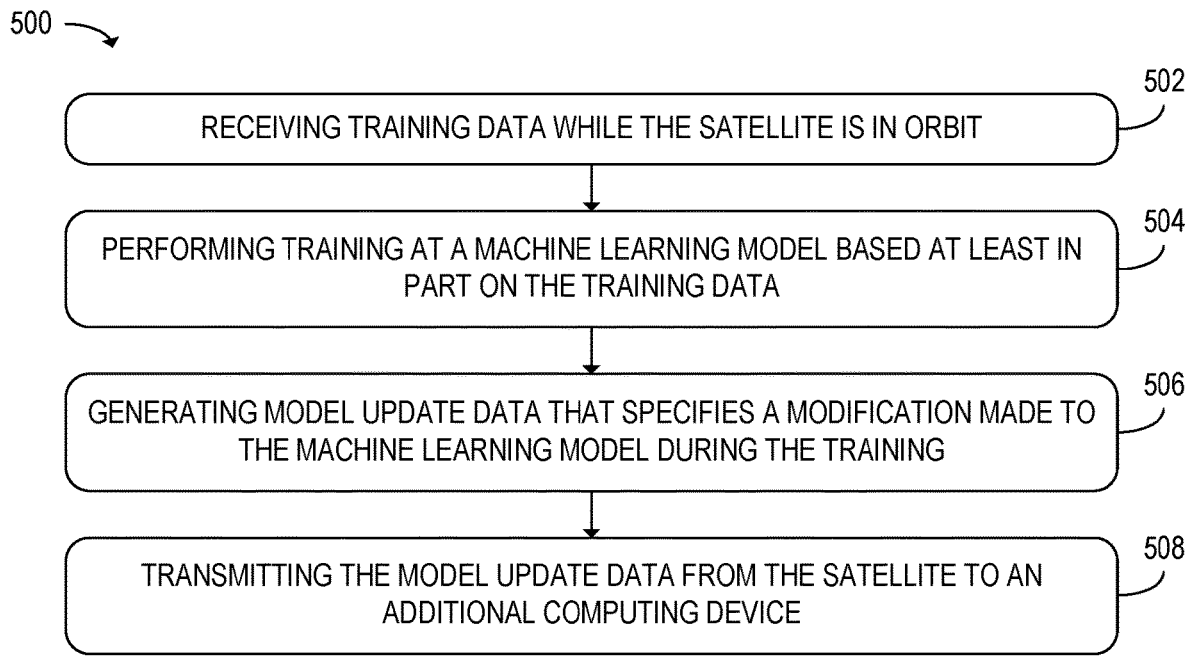
FIG. 10A shows a flowchart of an example method for use with an onboard computing device of a satellite, according to the example of FIG. 1.

FIG. 10A shows a flowchart of an example method 500 for use with an onboard computing device of a satellite. The method 500 may, for example, be performed at the processor 12 included in the onboard computing device 11 of the satellite 10. At step 502, the method 500 may include receiving training data while the satellite is in orbit. The training data may, in some examples, include a plurality of satellite images collected at the satellite via an imaging sensor. The plurality of satellite images may, in such examples, be images of the Earth or images of other objects. In other examples, the training data may additionally or alternatively include data received at the satellite in a communication signal from a ground-based sender device.

At step 504, the method 500 may further include performing training at a machine learning model based at least in part on the training data. The machine learning model may, for example, be a predictive model configured to generate predictions of features included in subsequently-received satellite image data. In other examples, some other type of machine learning model may be trained at the satellite. Performing training at the machine learning model may include updating the parameters of the machine learning model via gradient descent.

At step 506, the method 500 may further include generating model update data that specifies a modification made to the machine learning model during the training. The model update data may, for example, include a plurality of parameters of the machine learning model following the modification of the machine learning model at the satellite. Additionally or alternatively, the model update data may include a gradient with respect to the plurality of parameters. The gradient may be the gradient of a loss function of the machine learning model.

At step 508, the method 500 may further include transmitting the model update data from the satellite to an additional computing device. The additional computing device may, for example, be a ground-based computing device. In such examples, model update data may be transmitted to the additional computing device via a ground station. Alternatively, the additional computing device may be an additional onboard computing device of an additional satellite. The model update data may be transmitted to the additional computing device at a time specified by an uplink-downlink schedule stored in memory at the satellite. In some examples, the uplink-downlink schedule may be received from the additional computing device.

Figure 10B:
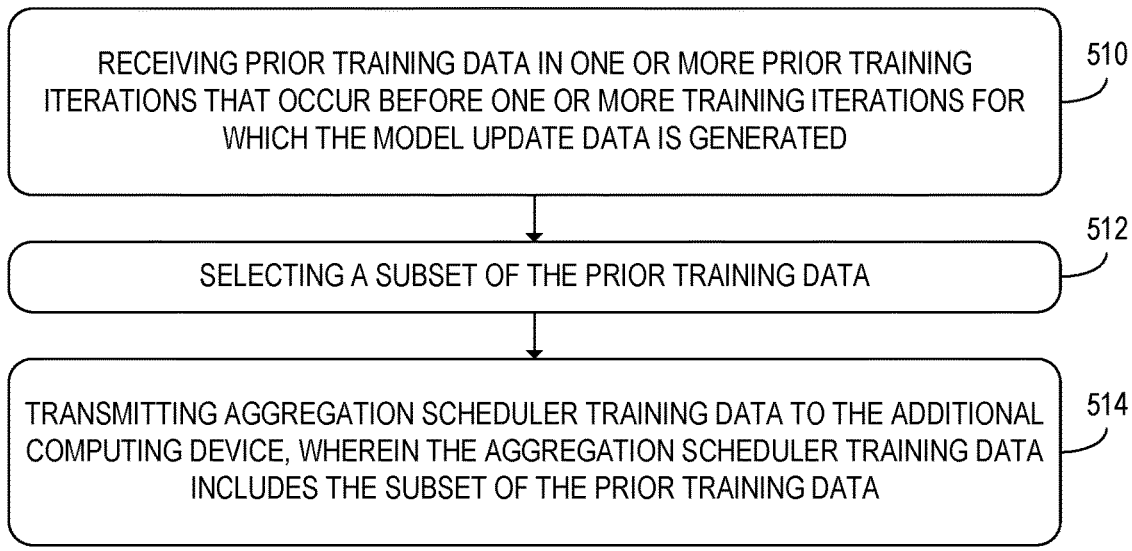
FIG. 10B shows additional steps of the method of FIG. 10A that may be performed in some examples prior to transmitting model update data to the additional computing device.

FIG. 10B shows additional steps of the method 500 that may be performed in such examples prior to transmitting the model update data to the additional computing device at step 508. At step 510, the method 500 may further include receiving prior training data. The prior training data may be received in one or more prior training iterations that occur before one or more training iterations for which the model update data is generated. For example, when the training data includes a plurality of satellite images, the prior training data may include additional satellite images that were captured prior to the satellite images included in the training data.

At step 512, the method 500 may further include selecting a subset of the prior training data. For example, the subset may be a random or pseudorandom sample of the prior training data. At step 514, the method 500 may further include transmitting aggregation scheduler training data to the additional computing device. The aggregation scheduler training data may include the subset of the prior training data. Thus, the subset of the prior training data may be used to train an aggregation scheduler machine learning model at the additional computing device.

FIG. 10C shows additional steps of the method 500 that may be performed in some examples. At step 516, subsequently to transmitting the model update data to the additional computing device at step 508, the method 500 may further include receiving an aggregated machine learning model from the additional computing device. At step 518, the method 500 may further include storing the aggregated machine learning model in memory. Thus, the machine learning model located at the satellite may be synchronized with the aggregated machine learning model that is trained at the additional computing device using aggregation data received from the plurality of satellites.

FIG. 11A shows a flowchart of a method 600 that may be performed at the processor of a computing device that is configured to communicate with a plurality of satellites. The method 600 shown in FIG. 11A may be performed at the additional device processor 112 of the additional computing device 110. The computing device at which the method 600 is performed may be a ground-based computing device configured to communicate with the plurality of satellites via one or more ground stations. Alternatively, the computing device may be an onboard computing device of an additional satellite.

At step 602, the method 600 may include generating a respective aggregation schedule for each of the plurality of satellites. The respective aggregation schedule generated for each of the satellites may include a local model version difference interval for that satellite. The local model version difference interval may be a number of sets of model update data received at the additional computing device from the satellite between updates to the aggregated machine learning model that are performed using the model update data from the satellite. The aggregation schedule may be generated at least in part at an aggregation scheduler machine learning model executed at the additional computing device.

At step 604, the method 600 may further include receiving aggregation data from the plurality of satellites. The aggregation data may be received at a respective plurality of downlink times indicated in uplink-downlink schedules of the satellites. The aggregation data may include model update data that specifies, for each satellite of the plurality of satellites, a corresponding modification made to a respective machine learning model during training of the machine learning model at the satellite. The model update data received from a satellite may, for example, include the values of a plurality of parameters of the machine learning model trained at the satellite or a gradient with respect to the plurality of parameters.

At step 606, the method 600 may further include performing training at an aggregated machine learning model based at least in part on the aggregation data received from the plurality of satellites. Thus, the model updates performed at the local machine learning models trained at the satellites may be aggregated into a machine learning model that utilizes the training data collected at the plurality of satellites. By performing portions of the training for the aggregated machine learning model at the satellites, those portions of the training may be parallelized between separate computing devices. In addition, the privacy of the training data collected at the satellites may be protected. For each satellite of the plurality of satellites, the training that occurs at the aggregated machine learning model may be performed at the local model version difference interval specified for that satellite in the aggregation schedule. Thus, the aggregated machine learning model may be trained using a buffer of model update data received during the local model version difference interval.

In some examples, at step 608, the method 600 may further include transmitting respective copies of the aggregated machine learning model to the plurality of satellites. The copies may be transmitted to the plurality of satellites at respective uplink times indicated in the uplink-downlink schedules. Accordingly, the machine learning models trained at the satellites may be iteratively updated, which may allow the accuracy of the machine learning models and the aggregated machine learning model to increase more quickly during training.

Figure 11B:
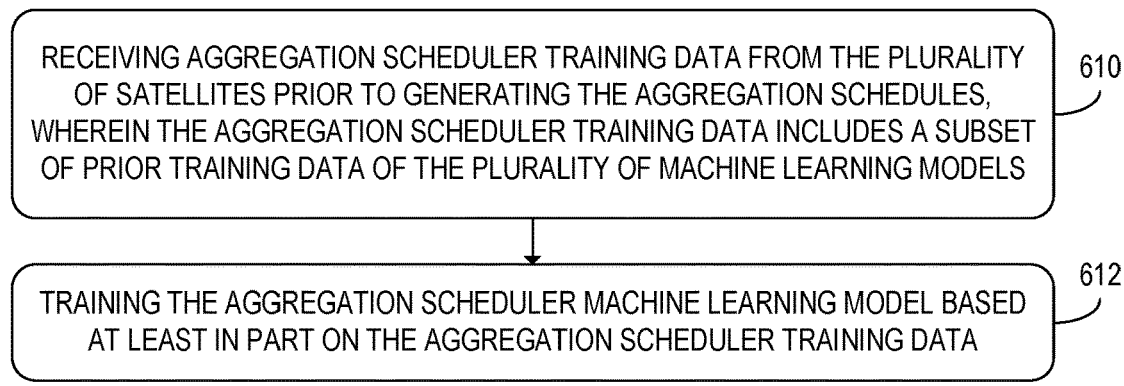
FIG. 11B additional steps of the method of FIG. 11A that may be performed when a plurality of aggregation schedules are generated at an aggregation scheduler machine learning model.
Figure 11C:
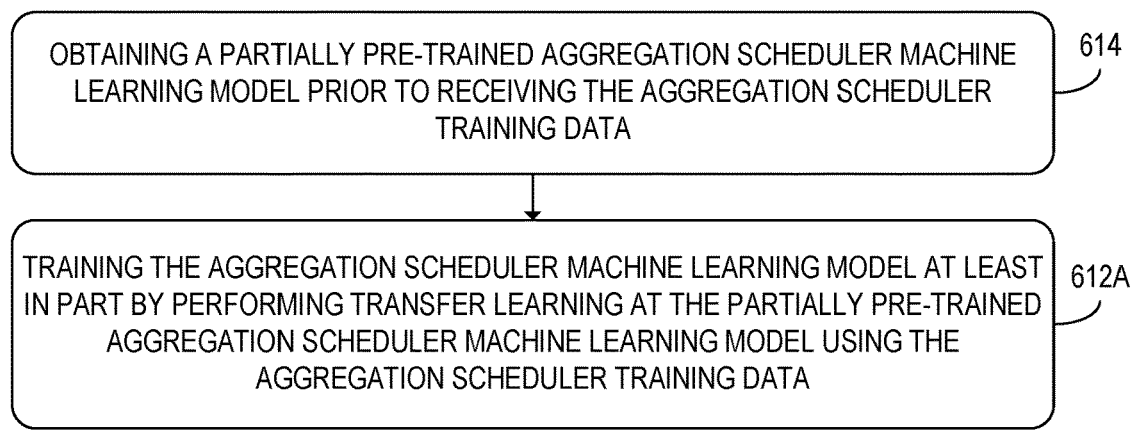
FIG. 11C shows additional steps of the method of FIG. 11B that may be performed in some examples.
Figure 11D:
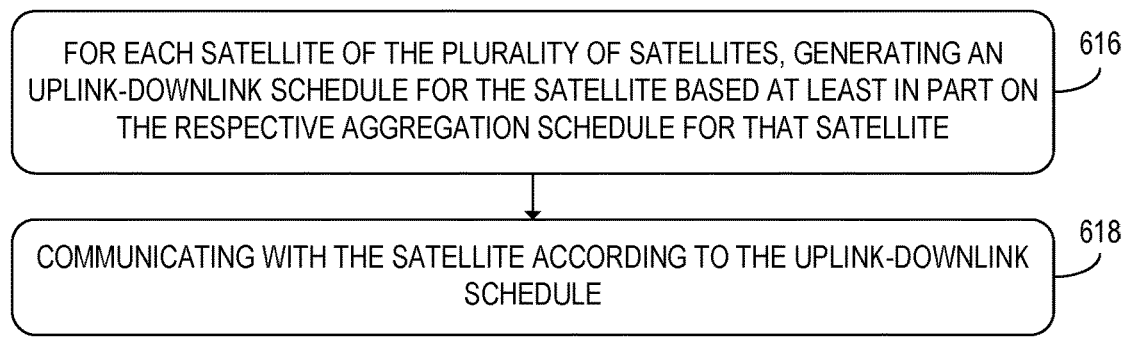
FIG. 11D shows additional steps of the method of FIG. 11A that may be performed in some examples.

FIGS. 11B-11D show additional steps of the method 600 that may be performed in some examples. FIG. 11B shows additional steps that may be performed in examples in which the plurality of aggregation schedules are generated at an aggregation scheduler machine learning model. The aggregation scheduler machine learning model may, for example, be a random forest or a deep neural network. At step 610, the method 600 may further include receiving aggregation scheduler training data from the plurality of satellites prior to generating the aggregation schedules. The aggregation scheduler training data may include a subset of prior training data of the plurality of machine learning models. At step 612, the method 600 may further include training the aggregation scheduler machine learning model based at least in part on the aggregation scheduler training data.

FIG. 11C shows additional steps of the method 600 that may be performed in some examples when the steps shown in FIG. 11B are performed. At step 614, the method 600 may further include obtaining a partially pre-trained aggregation scheduler machine learning model prior to receiving the aggregation scheduler training data. The partially pre-trained aggregation scheduler machine learning model may be pre-trained at the computing device or received from another computing device. At step 612A, which may be performed when performing step 612, the method 600 may further include training the aggregation scheduler machine learning model at least in part by performing transfer learning at the partially pre-trained aggregation scheduler machine learning model using the aggregation scheduler training data. The aggregation scheduler machine learning model may thereby be trained via transfer learning. Transfer learning may reduce the amount of computing and the amount of training data used when training the aggregation scheduler machine learning model.

As shown in FIG. 11D, the method 600 may further include, in some examples, generating a respective uplink-downlink schedule for each satellite of the plurality of satellites. The uplink-downlink schedule for each satellite may be generated based at least in part on the aggregation schedule for that satellite. The uplink-downlink schedule may specify the uplink times for the aggregated machine learning model and the downlink times for the model update data such that uplinks and downlinks of redundant data are avoided. At step 618, the method 600 may further include communicating with the satellite according to the uplink-downlink schedule.

Results are provided below for a simulation of federated learning in a computing environment that includes a plurality of satellites. The simulated network topology was the network topology of a PLANNET LABS satellite constellation that includes 20 satellites. The 20 satellites included in the constellation are configured to communicate with two ground stations. In the simulation, the machine learning models were trained to perform image classification on the CIFAR-10 dataset. The machine learning models were convolutional neural networks using the LeNet architecture. The target test accuracy for the machine learning models was 60%. Four different federated learning approaches were simulated: fully synchronous federated learning, fully asynchronous federated learning, FedBuff with a buffer size of K=16, and federated learning using an aggregation schedule generated with a random forest as discussed above. Fully synchronous federated learning reached the target test accuracy of 60% in 98 simulated days, fully asynchronous federated learning did not reach the target accuracy within the simulated time period of 150 simulated days, FedBuff reached the target test accuracy in 24.5 simulated days, and federated learning with the aggregation schedule generate with the random forest reached the target test accuracy in 17.5 simulated days. Thus, federated learning using an aggregation schedule generated with a random forest outperformed the next-fastest federated learning method by 8 simulated days in the above simulation.

Using the devices and methods discussed above, machine learning models may be trained at satellites using federated learning. Federated learning may allow the bandwidth of communication channels between the satellites and a ground station to be utilized more efficiently when training the machine learning models. In addition, federated learning may protect the privacy of the raw data collected at the satellites.

Since the satellites have predictable schedules of connectivity with ground stations or with other satellites, those connectivity schedules may be utilized to determine when aggregation of the machine learning models occurs. Aggregation schedules generated in this manner may allow high idleness times and update staleness to be avoided, thereby allowing the accuracy of the machine learning models to increase more quickly during training. The systems and methods of aggregation scheduling discussed above may therefore allow federated learning to be more efficiently in computing environments that include satellites.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
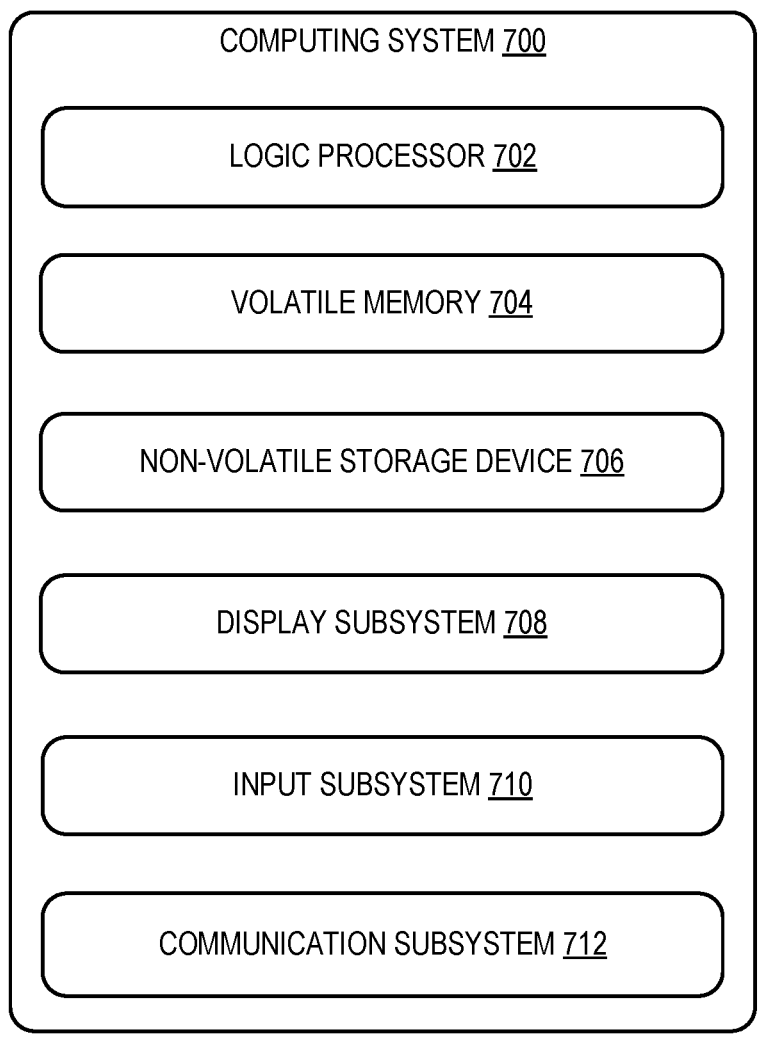
FIG. 12 shows a schematic view of an example computing environment in which the onboard computing device and/or the additional computing device of FIG. 1 may be included.

FIG. 12 schematically shows a non-limiting embodiment of a computing system 700 that can enact one or more of the methods and processes described above. Computing system 700 is shown in simplified form. Computing system 700 may embody the onboard computing device 11 and the additional computing device 110 described above and illustrated in FIG. 1. Components of the computing system 700 may be included in one or more satellite computing devices, personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 12.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs discuss several aspects of the present disclosure. According to one aspect of the present disclosure, a satellite is provided, including an onboard computing device. The onboard computing device may include a processor configured to receive training data while the satellite is in orbit. The processor may be further configured to perform training at a machine learning model based at least in part on the training data. The processor may be further configured to generate model update data that specifies a modification made to the machine learning model during the training. The processor may be further configured to transmit the model update data from the satellite to an additional computing device.

According to this aspect, the processor may be configured to transmit the model update data to the additional computing device at a time specified by an uplink-downlink schedule stored in memory at the satellite.

According to this aspect, the processor may be further configured to receive prior training data in one or more prior training iterations that occur before one or more training iterations for which the model update data is generated. The processor may be further configured to select a subset of the prior training data. The processor may be further configured to transmit aggregation scheduler training data to the additional computing device. The aggregation scheduler training data may include the subset of the prior training data.

According to this aspect, the training data may include a plurality of satellite images collected at the satellite via an imaging sensor.

According to this aspect, the additional computing device may be a ground-based computing device. The processor may be configured to transmit the model update data to the additional computing device via a ground station.

According to this aspect, the additional computing device may be an additional onboard computing device of an additional satellite.

According to this aspect, the model update data may include a plurality of parameters of the machine learning model following the modification of the machine learning model at the satellite, or a gradient with respect to the plurality of parameters.

According to this aspect, the processor may be configured to receive an aggregated machine learning model from the additional computing device subsequently to transmitting the model update data to the additional computing device. The processor may be further configured to store the aggregated machine learning model in memory.

According to another aspect of the present disclosure, a computing device is provided, including a processor configured to generate a respective aggregation schedule for each of a plurality of satellites. The aggregation schedule generated for a satellite may specify a local model version difference interval for the satellite. The processor may be further configured to receive aggregation data from the plurality of satellites. The aggregation data may include model update data that specifies, for each satellite of the plurality of satellites, a corresponding modification made to a respective machine learning model during training of the machine learning model at the satellite. The processor may be further configured to perform training at an aggregated machine learning model based at least in part on the aggregation data received from the plurality of satellites. For each satellite of the plurality of satellites, the training may be performed at the local model version difference interval specified for that satellite in the aggregation schedule.

According to this aspect, the processor may be further configured to generate the aggregation schedules at least in part at an aggregation scheduler machine learning model.

According to this aspect, the processor may be further configured to receive aggregation scheduler training data from the plurality of satellites prior to generating the aggregation schedules. The aggregation scheduler training data may include a subset of prior training data of the plurality of machine learning models. The processor may be further configured to train the aggregation scheduler machine learning model based at least in part on the aggregation scheduler training data.

According to this aspect, the processor may be further configured to obtain a partially pre-trained aggregation scheduler machine learning model prior to receiving the aggregation scheduler training data. The processor may be further configured to train the aggregation scheduler machine learning model at least in part by performing transfer learning at the partially pre-trained aggregation scheduler machine learning model using the aggregation scheduler training data.

According to this aspect, for each satellite of the plurality of satellites, the processor may be further configured to generate an uplink-downlink schedule for the satellite based at least in part on the respective aggregation schedule for that satellite. The processor may be further configured to communicate with the satellite according to the uplink-downlink schedule.

According to this aspect, the computing device may be a ground-based computing device configured to communicate with the plurality of satellites via one or more ground stations.

According to this aspect, the computing device may be an onboard computing device of an additional satellite.

According to this aspect, the respective aggregation data for each satellite of the plurality of satellites may include a plurality of parameters of the machine learning model following the modification of the machine learning model at the satellite, or a gradient with respect to the plurality of parameters.

According to another aspect of the present disclosure, a method for use with an onboard computing device of a satellite is provided. The method may include receiving training data while the satellite is in orbit. The method may further include performing training at a machine learning model based at least in part on the training data. The method may further include generating model update data that specifies a modification made to the machine learning model during the training. The method may further include transmitting the model update data from the satellite to an additional computing device.

According to this aspect, the model update data may be transmitted to the additional computing device at a time specified by an uplink-downlink schedule stored in memory at the satellite.

According to this aspect, the method may further include receiving prior training data in one or more prior training iterations that occur before one or more training iterations for which the model update data is generated. The method may further include selecting a subset of the prior training data. The method may further include transmitting aggregation scheduler training data to the additional computing device. The aggregation scheduler training data may include the subset of the prior training data.

According to this aspect, the method may further include receiving an aggregated machine learning model from the additional computing device subsequently to transmitting the model update data to the additional computing device. The method may further include storing the aggregated machine learning model in memory.

"And/or" as used herein is defined as the inclusive or ∨, as specified by the following truth table:

| A | B | A ∨ B |
|---|---|-------|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A satellite comprising:
an onboard computing device including a processor configured to:
receive training data while the satellite is in orbit;
perform training of a neural network based at least in part on the training data to thereby generate a modified neural network with modified parameters;
generate neural network update data including the modified neural network parameters and/or a gradient with respect to the modified neural network parameters; and
transmit the neural network update data from the satellite to an additional computing device.

2. The satellite of claim 1, wherein the processor is configured to transmit the neural network update data to the additional computing device at a time specified by an uplink-downlink schedule stored in memory at the satellite.

3. The satellite of claim 1, wherein the processor is further configured to:
receive prior training data in one or more prior training iterations that occur before one or more training iterations for which the neural network update data is generated;
select a subset of the prior training data; and
transmit aggregation scheduler training data to the additional computing device, wherein the aggregation scheduler training data includes the subset of the prior training data.

4. The satellite of claim 1, wherein the training data includes a plurality of satellite images collected at the satellite via an imaging sensor.

5. The satellite of claim 1, wherein:
the additional computing device is a ground-based computing device; and
the processor is configured to transmit the neural network update data to the additional computing device via a ground station.

6. The satellite of claim 1, wherein the additional computing device is an additional onboard computing device of an additional satellite.

7. The satellite of claim 1, wherein the processor is configured to:
receive an aggregated neural network from the additional computing device subsequently to transmitting the neural network update data to the additional computing device; and
store the aggregated neural network in memory.

8. A computing device comprising:
a processor configured to:
generate a respective aggregation schedule for each of a plurality of satellites, wherein the aggregation schedule generated for a satellite specifies a local neural network version difference interval for the satellite;
receive aggregation data from the plurality of satellites, wherein the aggregation data includes neural network update data that specifies, for each satellite of the plurality of satellites:
modified neural network parameters of a respective neural network trained at the satellite; and/or
a gradient with respect to the modified neural network parameters; and
perform training at an aggregated neural network based at least in part on the aggregation data received from the plurality of satellites, wherein, for each satellite of the plurality of satellites, the training is performed at the local neural network version difference interval specified for that satellite in the aggregation schedule.

9. The computing device of claim 8, wherein the processor is further configured to generate the aggregation schedules at least in part at an aggregation scheduler neural network.

10. The computing device of claim 9, wherein the processor is further configured to:
receive aggregation scheduler training data from the plurality of satellites prior to generating the aggregation schedules, wherein the aggregation scheduler training data includes a subset of prior training data of the plurality of neural networks; and
train the aggregation scheduler neural network based at least in part on the aggregation scheduler training data.

11. The computing device of claim 10, wherein the processor is further configured to:
obtain a partially pre-trained aggregation scheduler neural network prior to receiving the aggregation scheduler training data; and
train the aggregation scheduler neural network at least in part by performing transfer learning at the partially pre-trained aggregation scheduler neural network using the aggregation scheduler training data.

12. The computing device of claim 8, wherein, for each satellite of the plurality of satellites, the processor is further configured to:
generate an uplink-downlink schedule for the satellite based at least in part on the respective aggregation schedule for that satellite; and
communicate with the satellite according to the uplink-downlink schedule.

13. The computing device of claim 8, wherein the computing device is a ground-based computing device configured to communicate with the plurality of satellites via one or more ground stations.

14. The computing device of claim 8, wherein the computing device is an onboard computing device of an additional satellite.

15. A method for use with an onboard computing device of a satellite, the method comprising:
receiving training data while the satellite is in orbit;
performing training of a neural network based at least in part on the training data to thereby generate a modified neural network with modified parameters;
generating neural network update data including the modified neural network parameters and/or a gradient with respect to the modified neural network parameters; and
transmitting the neural network update data from the satellite to an additional computing device.

16. The method of claim 15, wherein the neural network update data is transmitted to the additional computing device at a time specified by an uplink-downlink schedule stored in memory at the satellite.

17. The method of claim 15, further comprising:
receiving prior training data in one or more prior training iterations that occur before one or more training iterations for which the neural network update data is generated;
selecting a subset of the prior training data; and
transmitting aggregation scheduler training data to the additional computing device, wherein the aggregation scheduler training data includes the subset of the prior training data.

18. The method of claim 15, further comprising:
receiving an aggregated neural network from the additional computing device subsequently to transmitting the neural network update data to the additional computing device; and
storing the aggregated neural network in memory.

* * * * *